Patented Dec. 19, 1922.

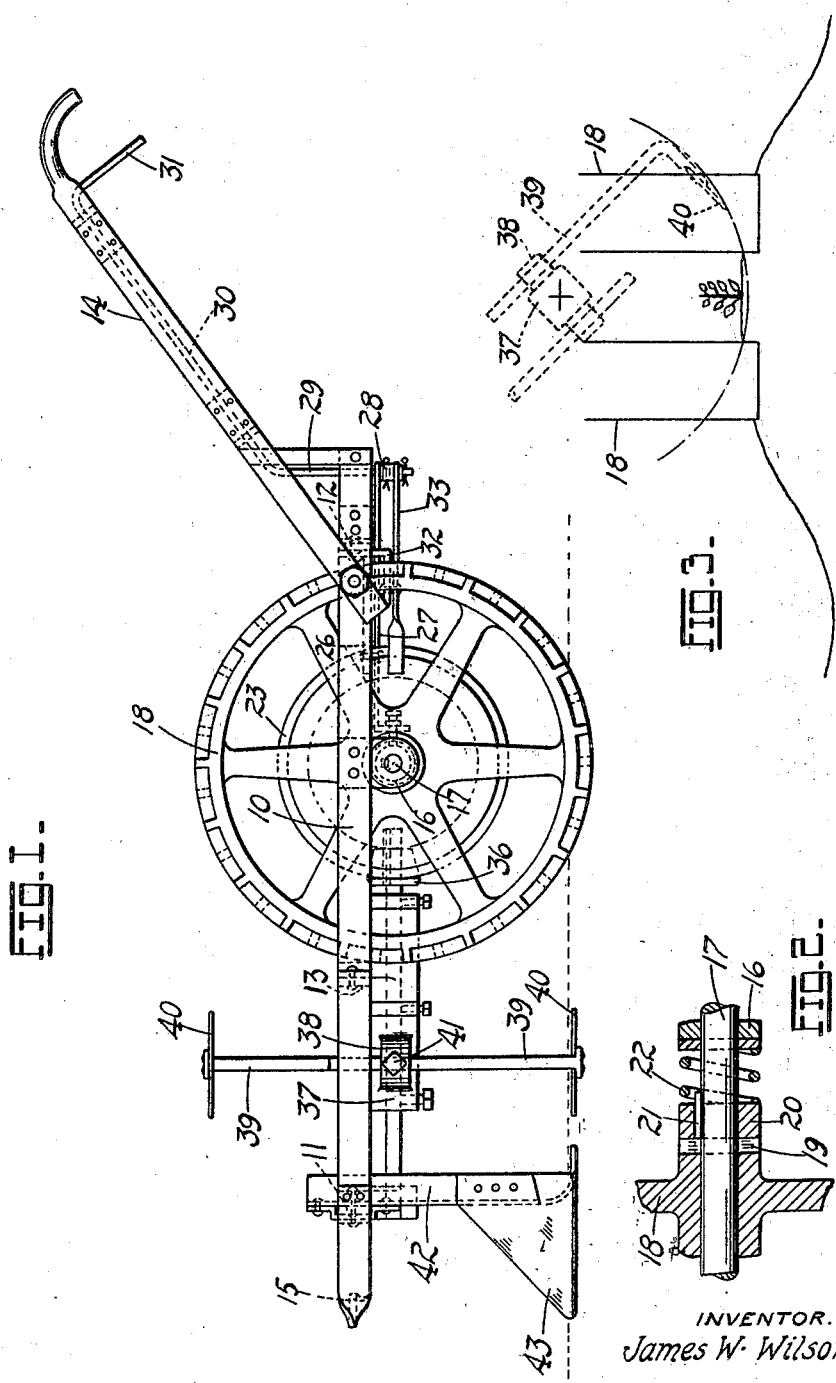

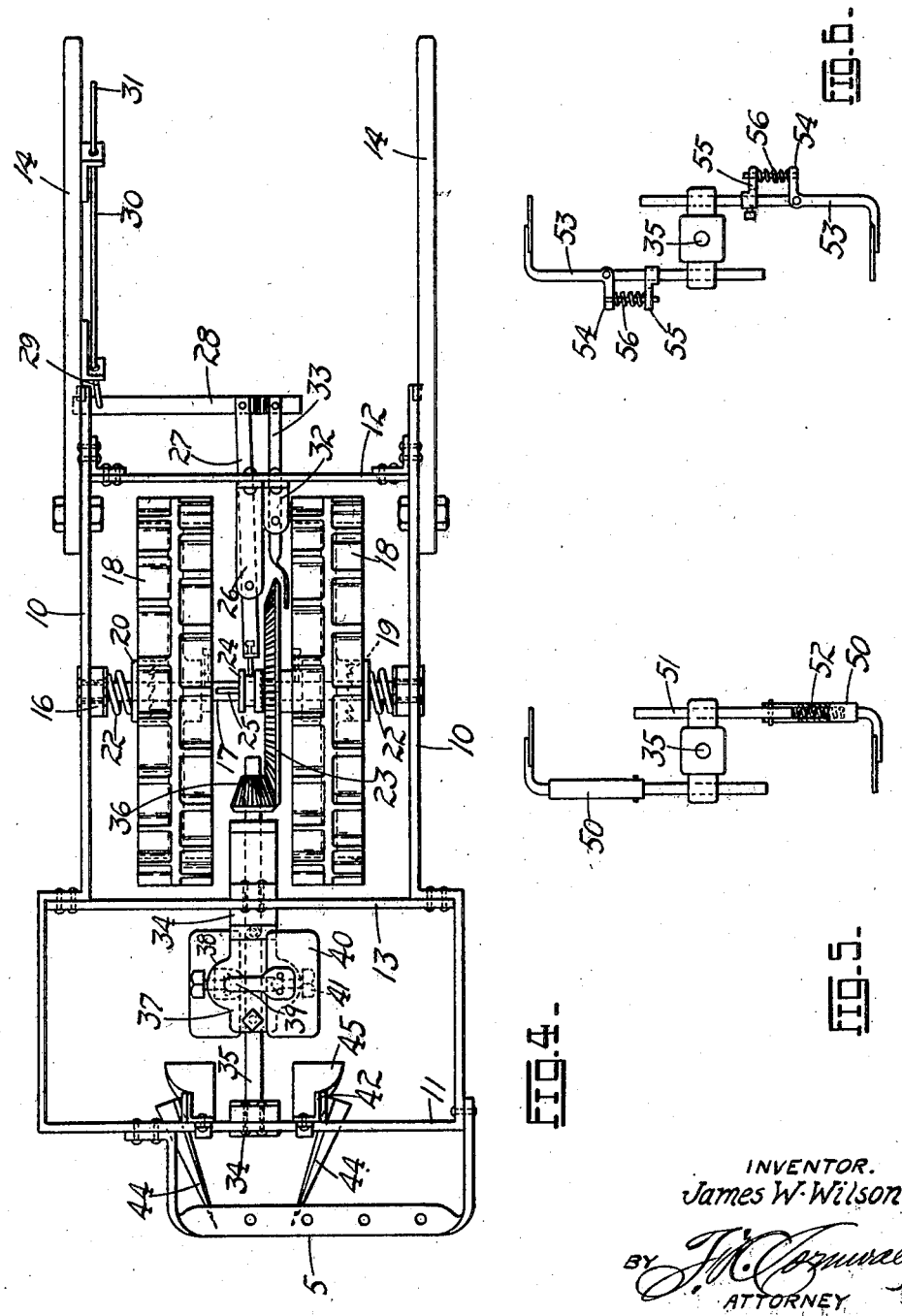

1,439,046

UNITED STATES PATENT OFFICE.

JAMES W. WILSON, OF ST. LOUIS, MISSOURI, ASSIGNOR TO WILSON COTTON CHOPPER COMPANY, OF ST. LOUIS, MISSOURI, A CORPORATION OF MISSOURI.

COTTON CHOPPER.

Application filed January 12, 1920. Serial No. 350,980.

*To all whom it may concern:*

Be it known that I, JAMES W. WILSON, a citizen of the United States, residing at St. Louis, Missouri, have invented a certain new and useful Improvement in Cotton Choppers, of which the following is a full, clear, and exact description, such as will enable others skilled in the art to which it appertains to make and use the same, reference being had to the accompanying drawings, forming part of this specification.

My invention relates to an agricultural implement generally known as a cotton chopper by reason of the fact that it is utilized for chopping or cutting at regular intervals young cotton plants from a row, thereby "thinning out" the rows so as to provide sufficient space between the plants which grow to maturity.

My invention contemplates the provision of a relatively simple implement which will be effective in rapidly and economically performing the barring off and chopping operations, said implement capable of being drawn by a single draft animal and arranged and constructed so that the cutting and chopping members will under all conditions accomplish the chopping operations at the proper height or elevation along the row of drilled cotton.

To achieve best results, in cutting cotton, it is essential that the plane of cut be coincident with or disposed a very slight distance below, the surface of the ground on the apex of the ridge and along which latter the cotton is planted, and it is one of the principal objects of my invention to provide rolling supports in the form of traction wheels for the chopping implements and which wheels are arranged so that they travel over the ground along the apex of the ridge and immediately adjacent to the sides of the row of cotton plants, and by virtue of such positions the traction wheels perform the functions of gauges to regulate and control the chopping operations of the cutters forming a part of the implement.

Further objects of my invention are, to provide a cotton chopper which may be easily and cheaply manufactured; to provide a machine that is of strong durable construction, capable of being readily controlled and handled by the operator, and, further, to provide a machine which is very effective in performing its intended functions.

With the foregoing and other objects in view, my invention consists in certain novel features of construction and arrangement of parts, hereinafter more fully described and claimed, and illustrated in the accompanying drawings, in which—

Figure 1 is a side elevational view of a cotton chopping machine of my improved construction.

Figure 2 is a detail section illustrating a clutch connection between the axle of the implement and the hub of one of the traction wheels thereof.

Figure 3 is a diagrammatic view graphically illustrating the operation of the revolving cutters of my improved implement.

Figure 4 is a top plan view of a cotton chopping machine embodying my invention.

Figure 5 is a detail elevational view partly in section of a modified form of the revolving cutters.

Fig. 6 is an elevational view of a further modified form of the revolving cutters.

By referring to the drawings, which illustrate a practical embodiment of my invention, it will be noted that I utilize a substantially rectangular frame comprising a pair of parallel side rails 10, a transversely disposed front end rail 11, a transversely disposed rear rail 12, and a transverse intermediate rail 13.

The revolving cutters of the machine are disposed between the front end rail 11 and transverse rail 13 and for this reason I prefer to arrange the forward portions of the side rails 10 further apart than the rear portions.

Secured in any suitable manner to the rear portion of the frame thus constructed and preferably to the side rails 10 are rearwardly and upwardly projecting handles 14, and secured to the front end rail 11 are the ends of a transversely disposed bar 15 that is perforated in order that a draft animal may be hitched thereto.

Secured to the side rails 10 are bearings 16 for the ends of a transversely disposed axle 17, and loosely mounted thereupon are traction wheels 18, the tread surfaces of which are preferably ribbed or corrugated in order to increase their tractive effect. These wheels are arranged relatively close together and in extended tests and actual service I have demonstrated that in order to achieve best results, these wheels should be spaced approximately six or seven inches apart. By arranging these wheels close together, they will, in service, travel in paths along the apex of the ridge in which the row of cotton is planted and which paths lie immediately to the sides of the cotton stocks.

In order to give the machine proper stability on the ground, the rims of these traction wheels should have considerable width and in practice I have demonstrated that wheels having a width of five or six inches meet all requirements. The outer faces of the hubs of these wheels are provided with clutch teeth 19 which when the wheels are moving forwardly over the ground are adapted to engage with oppositely disposed teeth formed on the inner faces of clutch collars 20, the latter being mounted upon keys or splines 21 so that they rotate with and at the same time are permitted to slide lengthwise upon the axle 17.

Arranged upon the end portions of the axle between these clutch collars 20 and the bearing 16 are compression springs 22 which normally exert pressure against said clutch collars and force the same into engagement with the hubs of the wheels. By virtue of this construction, when the machine is moving forwardly, the wheels, clutch collars, and axle 17 rotate together as one part, but in the event that the machine is moved rearwardly, the wheels will turn loosely on the axle and the teeth 19 on the hubs of said wheels will ride past the oppositely disposed teeth on the clutch collars 20.

Loosely mounted on the axle 17 between the traction wheels is a comparatively large beveled gear wheel 23, the inner end of the hub of which is provided with a clutch face that is adapted to be engaged by the corresponding clutch face formed on the adjacent end of a grooved collar 24. This collar is mounted upon a key 25 so that it rotates with and has longitudinal sliding movement upon the axle.

Fulcrumed upon a bracket 26 that projects forwardly from transverse rail 12 is a lever 27, the forward end of which is positioned in the groove in collar 24 and the rear end of this lever is pivotally connected to a transversely disposed link 28 that is positioned immediately to the rear of transverse rail 12. Pivotally connected to the righthand end of this link 28 is the lower end of a crank arm 29, the same depending from the forward end of a rock shaft 30, the latter being mounted for rotation in suitable bearings on the righthand one of the handles 14. The rear end of this rock shaft is bent downwardly to form a crank handle 31, thereby providing means for readily imparting movement to the rock shaft and parts connected thereto.

Fulcrumed upon a bracket 32 that is secured to rail 12 adjacent to the bracket 26 is a lever 33, the rear end thereof being pivotally connected to link 28 and the forward end of this lever is positioned immediately adjacent to the marginal edge of the beveled gear wheel 23.

Journaled in suitable bearings 34 on the rails 11 and 13 is a longitudinally disposed shaft 35 and mounted on the rear end thereof is a beveled pinion 36 which meshes with the beveled gear wheel 23. Adjustably mounted on this shaft 35 between the rails 11 and 13 is a block 37 on which is formed a pair of oppositely disposed ears 38. These ears are perforated in order to receive shanks 39, the outer ends of which carry cutting blades 40. The shanks 39 are locked in their adjusted positions in the ears 38 by means of set screws 41 and the cutting blades carried by the outer ends of said shanks are disposed at right angles to said shanks so that in operation they will make a substantially horizontal cut across the row immediately in front of the traction wheels. These cutting blades 40 may be of any desired width, although in practice I prefer to make them approximately seven or eight inches wide.

Secured in any suitable manner to the front rail 11 are depending upright members 42 and secured to the lower portions thereof and projecting forwardly therefrom are inclined plates 43, the lower horizontal edges of which are bent outwardly into substantially horizontal planes to form cutting blades 44.

While the machine is in operation these blades travel along the sides of the row of cotton plants and are effective in cutting weeds and the like, the plane of cut being directly upon the normal surface of the ground. These blades thus serve to smooth the ground to form tracks for the wheels 18, but said blades are not intended to cultivate or disturb the surface of the ground in any way except to possibly cut weeds close to the ground, and throw aside clods. These blades act as ground supports and with the wheels 18, determine the depth of cut of the chopping blades.

Secured to the lower portions of the depending members 42 and to the rear of the cutting blades 44 are combined leveling and gauging plates 45 which in service ride directly over the normal surface of the ground immediately to the sides of the row of cotton plants, thereby tending to smooth said ground directly in advance of the paths of travel of the traction wheels 18 and at the same time cooperating with the wheels 18 in forming a gauge to regulate the plane of cut of the blades 40.

The operation of my improved cotton chopping machine is as follows:

As the implement is drawn forwardly, the operator by grasping the rear ends of handles 14 guides said implement so that the traction wheels 18 travel in paths to the sides of and immediately adjacent to the row of cotton plants, and thus said wheels travel upon the crest or highest portion of the ridge.

By proper manipulation of crank arm 31, shaft 30 is rocked and through parts 28 and 27 the grooved clutch collar is shifted into locking engagement with the hub of gear wheel 23, with the result that said gear wheel will rotate with axle 17, the latter being locked to the traction wheels by means of the clutch collars 20. As the beveled gear wheel is thus rotated, rotary motion will be imparted to shaft 35 through pinion 36 and the arms 39 carrying the cutting blades 40 will be revolved so that said blades will make a series of transverse cuts along the row of cotton plants, the plane of cut being slightly below the surface of the ground, as illustrated in Figure 3. This cutting operation removes all the plants within a section of approximately seven inches or whatever the width of the cutting blades may be, and leaves those plants which have sprouted within an approximate two inch section between the cut-out sections of the row.

In order to achieve proper results, the plane of cut should be made a very slight distance below the normal surface of the ground immediately adjacent to the cotton plants, although satisfactory results can be obtained if the plane of cut is coincident with the surface of the ground immediately surrounding the relatively small cotton plants, and by spacing the traction wheels relatively close together so that they travel along the top of the ridge, in which the cotton is planted, and effecting a proper adjustment of the combined leveling and gauging plates 45, I am able to effect the cutting operations in the proper plane regardless of the width of the ridge, the height thereof, or the irregularities in the level of said ridge, and in the surface of the water furrows between the ridges.

To insure relatively smooth paths of travel for the traction wheels, I provide the cutters 44 which act to smooth or bar off the crest of the ridge immediately to the sides of the row of cotton plants, and the traction wheels traveling over these smoothed off paths or portions combine with the gauging plates 45 in forming a traveling support to control and regulate the cutting action of the blades 40.

To render the cutting mechanism inoperative, the operator rocks shaft 30 by proper manipulation of the crank arm 31 so as to actuate parts 28 and 27 to disconnect clutch collar 24 from the hub of beveled gear wheel 23, and simultaneous with this action, the forward end of lever 33 is brought into contact with the rear side of the beveled gear wheel, thereby acting as a friction brake to stop the movement of said gear wheel and consequently stopping the operation of the shaft 35 and parts carried thereby.

By arranging the clutch collars 20 between axle 17 and the hubs of the traction wheels, either one of the latter may rotate independently of the other without dragging while the machine is being turned around at the end of a furrow.

In Figure 5 I have illustrated a form of cutting blade carrying shank that is yielding in the event that the blade strikes against a stone, root or the like, such construction including a sleeve 50 that carries the cutting blade at its outer end and said sleeve being mounted for telescoping movement upon the shank 51 that is adjustably connected to the shaft 35.

Arranged within the sleeve and bearing against the end of the shank 51 is a relatively stiff coil spring 52 which maintains the sleeve and blade in proper operative position on the shank under normal conditions but which will permit said sleeve and blade to move inwardly in the event that the blade encounters a hard unyielding object.

In Figure 6 I have illustrated a modified form of the yielding blade and which arrangement comprises a pivotally mounted blade carrying shank 53, the same being provided with a short crank arm 54 and arranged between the latter and an arm 55 that projects from the shank that is carried by shaft 35 is a relatively stiff compression spring 56.

A cotton chopping machine of my improved construction is comparatively simple, is strong and durable, and very effective in performing its intended functions.

By providing traction wheels that have relatively wide rims and arranging said wheels relatively close together, they will travel over the crest of the ridge in which the row of cotton is planted in paths immediately adjacent to the row of cotton plants, and as a result, the revolving blades will at all times and under all conditions perform the cutting operations in the desired plane, namely, immediately beneath or directly upon the surface of the ground from which the cotton plants project.

It will be readily understood that minor changes in the size, form and construction of the various parts of my improved chopping machine can be made and substituted for those herein shown and described, without

I claim:

1. In a cotton chopper, a pair of runner-shaped gauge plates adjustably spaced from each other transversely of the chopper and far enough apart to permit cotton plants to pass between them but close enough together to ride upon the earth in close proximity to the cotton plants, a pair of wheels spaced from said plates longitudinally of the chopper and from each other, and blades mounted to revolve transversely of the chopper with the lower arc of their revolution in substantial horizontal and longitudinal alignment with the space between said plates.

2. In a cotton chopper, a pair of ground wheels arranged abreast and spaced from each other so as to travel along the earth in close proximity to the cotton plants and on opposite sides of the plants, a rigid frame mounted on said wheels and extending forwardly therefrom, chopper blades mounted on said forwardly extending frame to revolve in a plane transversely thereof, and a pair of plates adjustably mounted on the forward portion of said frame, each adapted to travel in front of one of said wheels to form tracks in the earth therefor and to cooperate therewith to hold said frame in a predetermined position relative to the earth so that said chopper blades may function independently of irregularities in the soil surface and of relative vertical movement by a draft animal such as otherwise would tend to vary the height of said blades from the ground.

In testimony whereof I hereunto affix my signature this 30th day of December, 1919.

JAMES W. WILSON.